(12) United States Patent
Aschauer et al.

(10) Patent No.: US 11,755,719 B2
(45) Date of Patent: Sep. 12, 2023

(54) INTERFACE FOR A HARDWARE SECURITY MODULE

(71) Applicant: Siemens Aktiengesellschaft, Munich (DE)

(72) Inventors: Hans Aschauer, Munich (DE); Rainer Falk, Poing (DE); Christian Peter Feist, Munich (DE); Daniel Schneider, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 24 days.

(21) Appl. No.: 16/956,270

(22) PCT Filed: Nov. 14, 2018

(86) PCT No.: PCT/EP2018/081135
§ 371 (c)(1),
(2) Date: Jun. 19, 2020

(87) PCT Pub. No.: WO2019/129416
PCT Pub. Date: Jul. 4, 2019

(65) Prior Publication Data
US 2021/0224377 A1 Jul. 22, 2021

(30) Foreign Application Priority Data
Dec. 27, 2017 (EP) ..................... 17210647

(51) Int. Cl.
*G06F 21/53* (2013.01)
*G06F 21/74* (2013.01)

(52) U.S. Cl.
CPC .............. *G06F 21/53* (2013.01); *G06F 21/74* (2013.01); *G06F 2221/032* (2013.01); *G06F 2221/2149* (2013.01)

(58) Field of Classification Search
CPC ......... G06F 21/50–54; G06F 21/70–79; G06F 2221/032; G06F 2221/2149
See application file for complete search history.

(56) References Cited

U.S. PATENT DOCUMENTS 8,300,811 B2  10/2012  Georgiades et al.
8,531,247 B2  9/2013  Dichtl
(Continued)

FOREIGN PATENT DOCUMENTS

CA  2536610 A1  8/2005
CN  1423202 A  6/2003
(Continued)

OTHER PUBLICATIONS

Extended European Search Report for corresponding European Patent Application No. 17210647.8, dated Jun. 14, 2018. 6 pages.
(Continued)

*Primary Examiner* — Madhuri R Herzog
(74) *Attorney, Agent, or Firm* — Schmeiser, Olsen & Watts LLP

(57) ABSTRACT

The following relates to a hardware security module for usage with manufacturing devices and a method for operating the same is provided. The security module includes: a secure element, which is adapted to detect an operating mode of the hardware security module; a first interface which is adapted to receive commands for controlling the hardware security module; a central processing unit for processing application program code in a secure environment; a second interface which is adapted for receiving configuration data, wherein the second interface is activated and deactivated in dependence of the detected operating mode.

14 Claims, 2 Drawing Sheets

(56) References Cited

U.S. PATENT DOCUMENTS

| | | | |
|---|---|---|---|
| 8,843,761 B2 | 9/2014 | Meyer et al. | |
| 8,892,616 B2 | 11/2014 | Dichtl | |
| 9,147,088 B2 | 9/2015 | Falk et al. | |
| 9,584,311 B2 | 2/2017 | Meyer et al. | |
| 9,720,700 B1* | 8/2017 | Brown | G06F 13/4068 |
| 2004/0183671 A1* | 9/2004 | Long | G08B 25/08 |
| | | | 340/539.1 |
| 2004/0210760 A1 | 10/2004 | McGrath et al. | |
| 2005/0193220 A1 | 9/2005 | Little et al. | |
| 2007/0237325 A1 | 10/2007 | Gershowitz et al. | |
| 2007/0291400 A1* | 12/2007 | Chang | G11B 21/12 |
| | | | 360/75 |
| 2009/0228639 A1* | 9/2009 | Cho | G06F 21/79 |
| | | | 711/E12.001 |
| 2010/0005264 A1* | 1/2010 | Ito | G06F 9/468 |
| | | | 711/163 |
| 2010/0036973 A1 | 2/2010 | Mardiks et al. | |
| 2011/0204729 A1 | 8/2011 | Lorenz et al. | |
| 2012/0190300 A1* | 7/2012 | August | H04B 5/0062 |
| | | | 455/41.1 |
| 2013/0156180 A1 | 6/2013 | Hess | |
| 2013/0212348 A1 | 8/2013 | Riou | |
| 2014/0155027 A1 | 6/2014 | Priel et al. | |
| 2014/0223088 A1* | 8/2014 | Hashimoto | G06F 11/076 |
| | | | 711/103 |
| 2015/0264080 A1 | 9/2015 | Bußer et al. | |
| 2015/0302200 A1 | 10/2015 | Tonry et al. | |
| 2015/0323919 A1 | 11/2015 | Schwepp et al. | |
| 2015/0341343 A1 | 11/2015 | Dichtl et al. | |
| 2016/0085976 A1 | 3/2016 | Schiffman et al. | |
| 2016/0253438 A1 | 9/2016 | Boffgen et al. | |
| 2016/0327923 A1 | 11/2016 | Papenbreer et al. | |
| 2016/0344704 A1 | 11/2016 | Stumpf et al. | |
| 2017/0164201 A1 | 6/2017 | Li et al. | |
| 2020/0169413 A1 | 5/2020 | Aschauer et al. | |

FOREIGN PATENT DOCUMENTS

| | | |
|---|---|---|
| CN | 1621994 A | 6/2005 |
| CN | 101650764 A | 2/2010 |
| CN | 101714411 A | 5/2010 |
| CN | 102171668 A | 8/2011 |
| CN | 102509673 A | 6/2012 |
| CN | 103532978 A | 1/2014 |
| CN | 103718182 A | 4/2014 |
| CN | 105683981 A | 6/2016 |
| CN | 106125586 A | 11/2016 |
| CN | 106687985 A | 5/2017 |
| EP | 2605445 A1 | 6/2013 |
| EP | 2870565 A1 | 5/2015 |
| EP | 2891102 A1 | 7/2015 |
| EP | 2976707 A1 | 1/2016 |
| EP | 3028140 A1 | 6/2016 |
| EP | 3413530 A1 | 12/2018 |
| WO | 2007023458 A2 | 3/2007 |
| WO | 2017137256 A1 | 8/2017 |

OTHER PUBLICATIONS

Examination Report in corresponding European Patent Application No. 17210647.8, dated Oct. 14, 2019. 4 pages.

International Search Report and Written Opinion for corresponding PCT Patent Application No. PCT/EP2018/081135 dated Feb. 13, 2019. 12 pages.

* cited by examiner

INTERFACE FOR A HARDWARE SECURITY MODULE

CROSS-REFERENCE TO RELATED APPLICATIONS

This application is a national stage entry of PCT Application No. PCT/EP2018/081135, having a filing date of Nov. 14, 2018, which claims priority to European Patent Application No. 17210647.8, having a filing date of Dec. 27, 2017, the entire contents of which are hereby incorporated by reference.

FIELD OF TECHNOLOGY

The following relates to the field of security enhancement in technical systems, like production and manufacturing systems, using a hardware security module and, in particular, refers to a hardware security module and a method for operating the same.

BACKGROUND

Nowadays, most of the data of technical systems transmitted over wired and/or wireless networks are not encrypted and thus they are vulnerable to security attacks. Even technologies utilizing network security protocols are not sufficient to protect against all relevant attacks. Thus, especially regarding potential system-internal and external or physical attackers, these electronic systems need to be protected against manipulations. In order to reliably enforce the security of software security mechanisms, the application of hardware security modules (HSM) is one effective countermeasure. For this reason, hardware security modules are deployed within the technical system that execute software security mechanisms in a physically protected runtime environment.

A hardware security module is a physical computing device that safeguards and manages digital keys for strong authentication and provides crypto-processing. These modules traditionally come in the form of a plug-in card or an external device that attaches directly to a computer or network server.

Hardware security modules may possess controls that provide tamper evidence such as logging and alerting and tamper respondence functions such as deleting keys or other secret data upon tamper detection. Each module may contain one or more tamper sensors and secure crypto-processor chips to prevent tampering and bus probing.

Many hardware security module systems have means to securely back up the keys they handle either in a wrapped form via the computer's operating system or externally using a smartcard or some other security token.

Because HSMs are often part of a mission-critical infrastructure such as a public key infrastructure or other technical systems, hardware security modules can typically be clustered for high availability.

In state of the art, it is known to use special types of hardware security modules, which have the ability to execute specially developed modules within the module's secure enclosure. Such an ability is useful, for example, in cases where special algorithms or business logic has to be executed in a secured and controlled environment. The modules with application code can be developed for example in native C language, in .NET, Java, or other programming languages. The application code may be extensive—depending on the context and application—and, therefore, loading of this application code may take a long time in state of the art systems.

Further, it is known to protect the access to hardware security modules by providing an authentication process, so that a user first must authenticate himself, e.g., by means of a password.

The following relevant documents are known: document U.S. Pat. No. 8,531,247 B2, document U.S. Pat. No. 8,892,616 B2, document U.S. Pat. No. 8,300,811 B2, document U.S. Pat. No. 9,147,088 B2, document U.S. Pat. No. 9,584,311 B2, document EP 2976707 B1, document EP 2 605 445 B1, document EP 2 870 565 A1, document EP 2 891 102 A1, document WO 2017137256 A1, document EP 2870565 B1, document EP 3028140 B1, document EP 17175275 and document U.S. Pat. No. 8,843,761 B2.

SUMMARY

Therefore, an aspect of the present invention is to provide a solution for loading application code efficiently into a hardware security module and to improve protection of the data on the hardware security module.

According to a first aspect, the present invention relates to a hardware security module (also abbreviated as HSM) for usage with electronic control or manufacturing devices and/or in the field of production or manufacturing (with a plurality of devices which need to be operated without an administrator).

The HSM comprises:
A secure element, which is adapted to detect an operating mode (sealed mode or unsealed mode) of the hardware security module;
A first interface (which serves as command interface) which is adapted to receive commands for controlling the hardware security module;
A central processing unit for processing application program code in a secure environment;
A second interface (which serves as configuration interface) which is adapted for receiving configuration data (e.g. a security image), wherein the second interface is activated and deactivated in dependence of the detected operating mode.

According to an exemplary embodiment the secure element directly controls a switch to activate or deactivate the second interface. The secure element may in this case be provided as separate element in the hardware security module, which has the advantage to address it dedicatedly.

In a first operating mode (unsealed mode), a program code can be loaded on the hardware security module. In a second operating mode (sealed mode), the loaded program code is fixed, i.e., it is not possible to upload new program code or to modify the uploaded program code (as the second interface if deactivated). However, commands can be sent via the first interface to the hardware security module that are processed by the loaded program code, and a response may be provided by the hardware security module via the first interface. The loaded program code may be automatically deleted when the operating mode is changed from sealed mode to unsealed mode.

According to an alternative exemplary embodiment the secure element is provided in the central processing unit. It may be integrated in the central processing unit. This reduces the building blocks of the hardware security module and improves manufacturing costs.

According to another exemplary embodiment the secure element is a key controlled switch. The switch may be provided as mechanical switch and has the advantage of providing a manual verification option, in that it is necessary that a user must operate the switch manually and intentionally. Thus, the risk of an accidental operation is reduced. The secure element in the form of a mechanical switch is located at a position on the hardware security module, which is difficult to access. For example, it may be provided at the back or rear side of the hardware security module. Typically, the hardware security modules are fixed on a mounting rail or attachment means, where the back of the hardware security module engages with the mounting rail. In this case the switch may be provided at the back. This has the advantage that for operating the switch, the user first is urged to take the hardware security module off and out of the mounting rail before he can change the switch. This makes the operation more secure by assuring that the switch may not be operated accidentally.

According to another exemplary embodiment the secure element is controlled by a command, which may be received via the first interface, which improves automatic operation of the hardware security module.

According to another exemplary embodiment the hardware security module comprises a third debug interface for debugging application program code. The third interface may be the same as the second interface. In an alternative exemplary embodiment, the third interface is a different interface for debugging the application program code, in particular, after a configuration, the new hardware security module program code may be debugged. The debugging may be executed locally and directly on the hardware security module.

According to another aspect, the present invention relates to a method for operating a hardware security module in different modes, comprising a sealed mode (which is a security mode for performing security functions, like encryption/decryption, key administration, processing received commands by the loaded program code, etc.) and an unsealed mode (which may be used for configuration), comprising the following steps:

Detecting the operating mode of the hardware security module;

Activating a second interface for receiving configuration data (e.g. a security image for configuring the hardware security module) if the unsealed mode has been detected and Deactivating the second interface automatically if the sealed mode has been detected, during which commands may be received via a first command interface.

According to another exemplary embodiment the configuration data may comprise data for configuring the hardware security module, and may, in particular, comprise a security image. A security image modifies or determines the processing of commands and command data received over the first interface by the HSM. The response code and response data provided by the HSM via the first interface in response to a received command image and data depend on the loaded security image. A security image may comprise program code (e.g., a Python script program code, a compiled C program code, a software library code), a firmware update image (e.g., a patch file for base firmware components of the HSM), a software container image (Docker image, runc image, virtual machine image) and/or configuration data (cryptographic key, digital certificate, parameters for a neural network).

According to another exemplary embodiment the second interface is deactivated logically. This has the advantage that no switch has to be operated manually and that the deactivation may be triggered by command or internal instruction provided by the hardware security module or by an external entity.

According to another exemplary embodiment the second interface is deactivated physically. It is also possible to combine the two options, mentioned above in order to provide a more secure protection, namely to deactivate the second interface physically and logically in the sealed mode. This allows a highly robust solution, where both a physical activation (by actuating the physical switch) and a logical activation (by providing an unseal command to the HSM via the first interface) are required to enable the second interface in an exemplary embodiment of the present invention. If a minor security level is sufficient, it is possible to apply another embodiment, in which the logical activation or the physical activation is sufficient to enable the second interface.

According to another exemplary embodiment the second interface is deactivated in dependence of at least one sensor signal, which is/are detected locally on the hardware security module. The sensor signal may be provided by a key switch, a press button, a mechanical push, a motion sensor, an accelerometer, a tilt sensor, or a slide switch. The sensor signal may be position signal, or a signal indicating movement or non-movement of the hardware security module. A movement of the hardware security module indicates that a user has operated or intends to operate the hardware security module by changing is operating mode. This feature helps to improve security of the method for operating the hardware security module.

According to another exemplary embodiment the operating mode may only be changed into the unsealed mode by a physical engagement locally on the hardware security module, for example by operating a mechanical switch or button (provided on a user interface or mechanically). Alternatively, the operating mode may only be changed into the unsealed mode logically via an unseal command.

In case the state or mode is changed from sealed to unsealed, the loaded security image and other secure data (configuration data, cryptographic keys, digital certificates, authentication tokens) will be automatically deleted. This improves security.

According to another exemplary embodiment the operating mode may be changed logically via a respective command (an unseal-command or seal command) to be received via the first interface. Alternatively, the command may be provided locally on the central processing unit. The central processing unit is adapted for state administration of the hardware security module. For example, different sensor signals may be processed in combination to provide a control signal for activation or deactivation of the second and/or third interface. The sensor signals may stem from position sensors, from motion sensors, housing switches, or other types of switches.

According to another exemplary embodiment the configuration data is deleted automatically in case the sealed mode is changed into the unsealed mode. This feature again improves security of the method for operating the hardware security module.

The configuration data may be provided as a computer program loadable into a processing unit of the hardware security module, the computer program comprising code adapted to perform configuration of the hardware security module when processed by the processing unit. The computer program may be stored in a memory, RAM or Flash on the hardware security module. The computer program may also be downloaded in downloadable form from a server entity.

In the following a short definition of terms is given.

A hardware security module (also abbreviate as HSM) is an electronic module, which comprises hardware and/or software parts. A hardware security module may be construed as piece of hardware and associated software/firmware that usually attaches to the inside of a computing entity, a programmable logic controller, a control unit, or a server and provides at least the minimum of cryptographic functions. These functions include (but are not limited to) encryption, decryption, key generation, key derivation, monotonic counter, random number generation, hashing, verification of biometric authentication data (e.g., fingerprint, iris scan and/or voice sample). The physical device offers some level of physical tamper-resistance and may have a user interface. Thus, security relevant components or parts of the module are protected against tampering and sensitive data are protected against compromise. The hardware security module may be especially designed for protecting e-safety applications in different technical areas, for example in automotive, such as automatic emergency break based on communications between vehicles (vehicle to vehicle communication), for autonomous driving, for e-car charging, or in the field of production for control communication, e.g., robot control, cloud robotics, control of a production machine for additive manufacturing (3D printing) or subtractive manufacturing (molding cutter, laser cutter), process automation of a chemical process, a conveyer belt, etc.

A secure element is a detection element, which is adapted to detect the operating state of the hardware security module. The state may be a sealed mode or an unsealed mode. It may be realized in software or hardware. It may be realized using a programmable cryptographic controller that provides an electric output signal to actuate an electric switch of the second interface. However, it may be realized also by firmware/software code executed by the CPU of the HSM, realizing a finite state machine. The states may be encoded as binary data structure. The state is encoded redundantly, e.g., by encoding the state value and a CRC checksum or a cryptographic checksum. A redundant state encoding. In a simple variant, only two states (sealed, unsealed) are distinguished. In a more powerful variant, different sealed states and/or different unsealed states may be distinguished. For example, in a first unsealed state, loading of firmware updates may be possible, while in a second unsealed mode, loading if application code may be possible.

The hardware security module has a first and a second interface and optionally a third interface, all being physical interfaces. According to an important aspect, the first and the second interface are different (physical) interfaces.

The first interface is for controlling the hardware security module and in particular for receiving commands and for sending responses. Further, the first interface may be used for providing result data determined by the loaded program code executed on the HSM depending on the received command and command data. It may be e.g. a RS232, a serial peripheral interface (SPI) or an Inter-Integrated Circuit interface (I2C).

The second interface is a configuration interface, which may be used for configuring the hardware security module. It may be used for loading firmware updates or application images, container images, updates and/or patches. The second interface may for example be a USB interface, a memory card interface, an SD card interface, or a JTAG interface. The second interface may be provided as hard disk drive (HDD) interface, which may be accessed over different bus types, including Serial ATA (SATA), SCSI, Serial Attached SCSI (SAS), and an Integrated Drive Electronics (IDE), in which the controller is integrated into the disk or CD-ROM drive. Alternatively, SCSI and/or SATA or other network interfaces, like Fibre Channel Ethernet or other high-speed bus interfaces, e.g. PCI, may be used. The second interface is used for configuring the hardware security module by loading configuration data or a security image. According to an important aspect to the present invention, the second interface is only operable in case the hardware security module is in the unsealed mode. Otherwise and, in particular, if the hardware security module is in the sealed mode, the second interface is physically and logically blocked.

The blocking is achieved by a switch. The switch is an electrical circuit, interrupting the current or diverting it from one conductor to another. It may use solid state devices such as transistors or integrated circuits.

BRIEF DESCRIPTION

Some of the embodiments will be described in detail, with reference to the following figures, wherein like designations denote like members, wherein.

DETAILED DESCRIPTION

The embodiment of the present invention relates to a hardware security module HSM.

Figure 1:
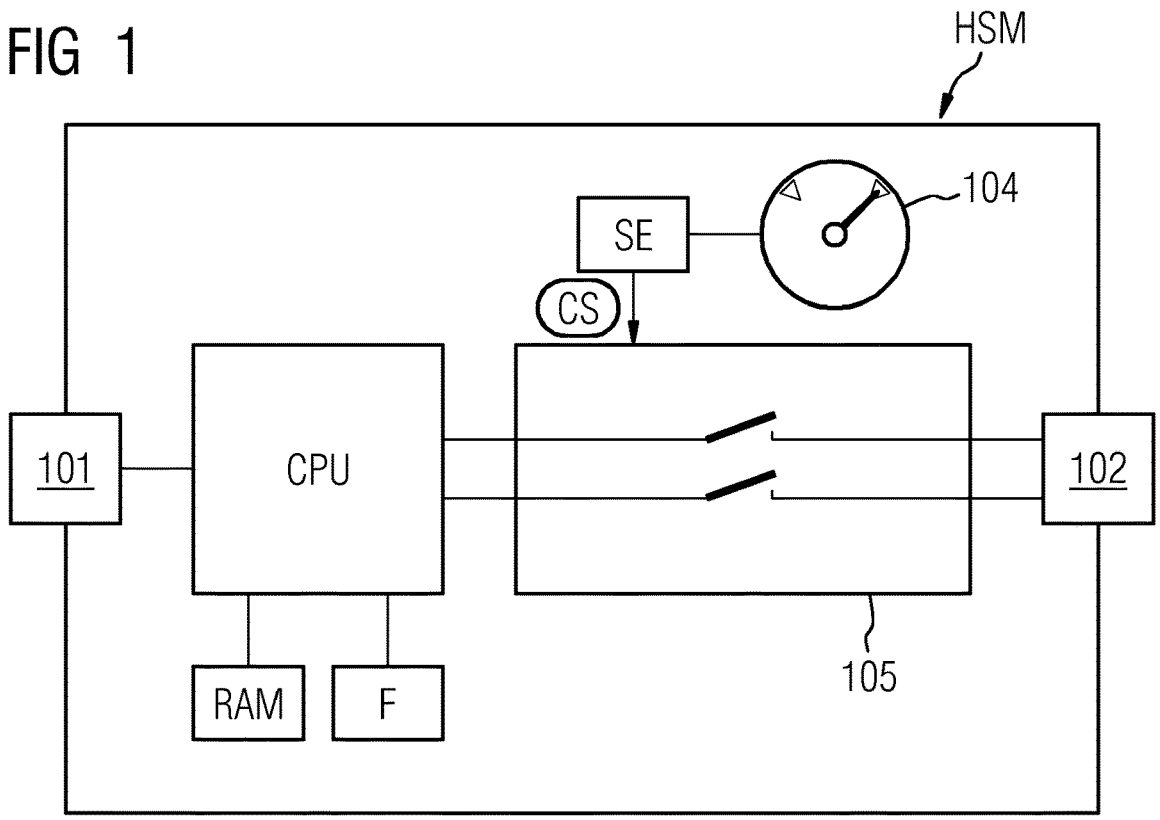
FIG. 1 depicts a schematic representation of a hardware security module in an exemplary embodiment.

FIG. 1 shows the hardware security module HSM according to an exemplary embodiment of the present invention in more detail. As can be seen in FIG. 1 on the left and right side, the hardware security module HSM has a first interface 101 and a different second interface 102 which are positioned differently on the hardware security module HSM. The hardware security module HSM further comprises a central processing unit CPU and memories like a RAM and/or a flash memory F for storing data and/or executable program code. The hardware security module HSM further comprises a secure element SE and a switch 104. The switch 104 may be a mechanical switch. The switch 104 may be positioned at the rear side of the hardware security module HSM. The secure element SE is adapted to detect the position or state of the switch 104 and to provide a control signal in reply to the detected state. The mode may be at least a sealed and an unsealed mode. In the sealed mode, secure operation of the hardware security module HSM must be assured and no additional access may be allowed in this mode. In particular, a configuration of the hardware security module HSM is not possible. For this reason, the second interface 102 is deactivated in the sealed state, whereas in the unsealed mode, a configuration of the hardware security module HSM and additional access via the second interface may be allowed. The control signal cs may serve as trigger signal for controlling another switch 105 which serves to physically decouple the second interface 102 in case a sealed mode has been detected by the secure element SE. Thus, in this embodiment, the hardware security module HSM comprises two different switches 104, 105. Switch 104 is adapted for user interaction and may be implemented as mechanical switch or button to be pushed on a user interface. The function of the switch 104 may also be provided alternatively via software embedded in the central processing unit CPU. Switch 105 is necessary to physically decouple the second interface 102 from the hardware security module HSM. The wired connections are disengaged in the sealed mode and during deactivation.

Figure 2:
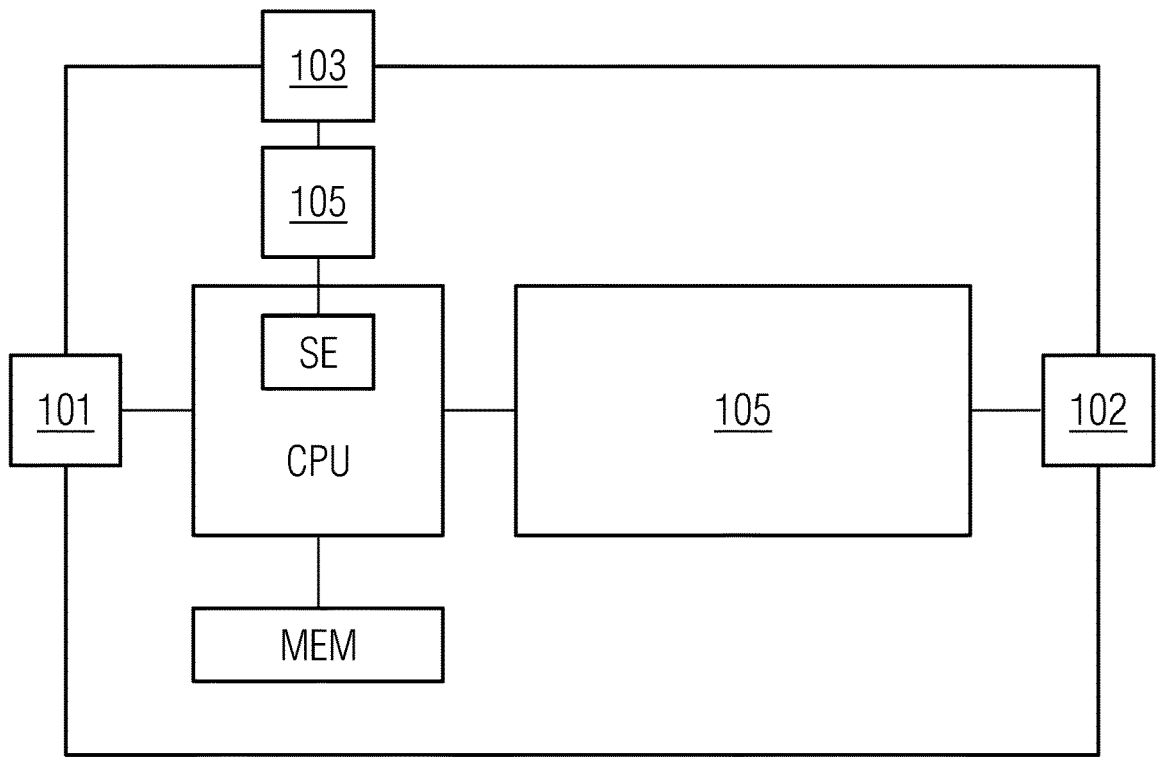
FIG. 2 depicts a hardware security module.

FIG. 2 shows another embodiment of the present invention. Here, the secure element SE is integrated into the central processing unit CPU and no switch 104 is provided. The mode of the hardware security module HSM (sealed or unsealed) is detected by the secure element automatically based on digital data and/or signals or instructions or commands. The memory MEM may be provided as any kind of memory MEM. In this embodiment, the hardware security module HSM comprises a third interface 103 which may serve as debug interface for debugging program code on the hardware security module HSM. The debug interface 103 is only activated in the unsealed mode, similarly as described before with respect to the second interface 102. Thus, the debug interface may only be used in the unsealed mode and is otherwise logically and/or physically decoupled from the communication system of the hardware security module HSM. For deactivating the third interface 103 the same switch 105 may be used or another instance of a switch.

Figure 3:
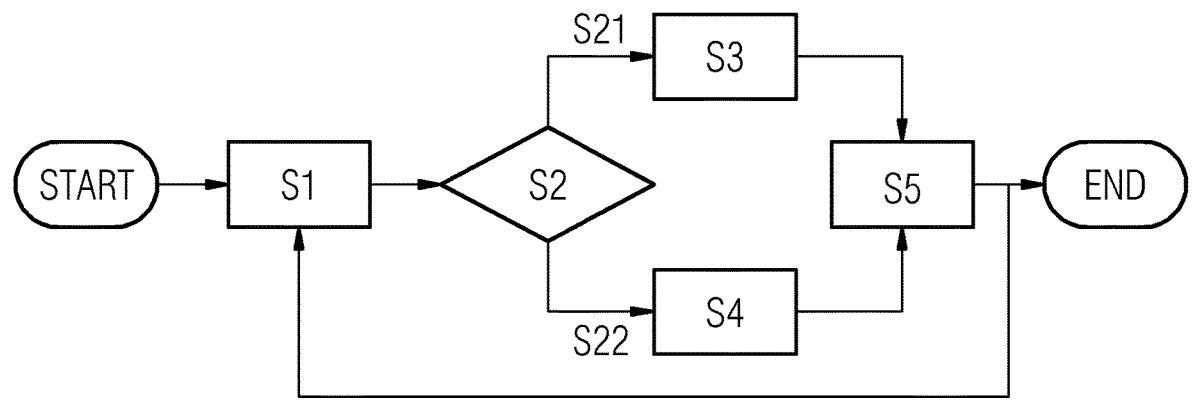
FIG. 3 depicts a flow chart of a method.

FIG. 3 is a flow chart of a method for operating the hardware security module HSM. The method depicted in FIG. 3 represents a mode-dependent operation of the hardware security module HSM. In step S1, the operating mode of the hardware security module HSM is detected. This may be executed by the secure element SE. In step S2, a distinction of cases is executed in order to automatically examine which is the actual operating mode or state of the hardware security module HSM. The upper part in FIG. 3 with reference numeral S21 indicates an unsealed mode which may be used for configuration. In step S3, the second and/or third interface 102, 103 are activated. The activation may be verified by an additional verification procedure before being applied. The verification procedure may be based on automatic execution of program code or may be based on user interaction, e.g., via a user interface. In step S5, it is decided if the mode-dependent operation of the hardware security module HSM should be continued or not. In case of continuation, it is branched out to step S1 again and the method continues as described above. Otherwise, the method may end. If the distinction of cases in S2 has revealed that the hardware security module HSM is operated in the sealed mode (in FIG. 3, the lower part with reference numeral S22), the second and/or third interface 102, 103 are deactivated automatically. The method continues with the step S5 as described above.

Figure 4:
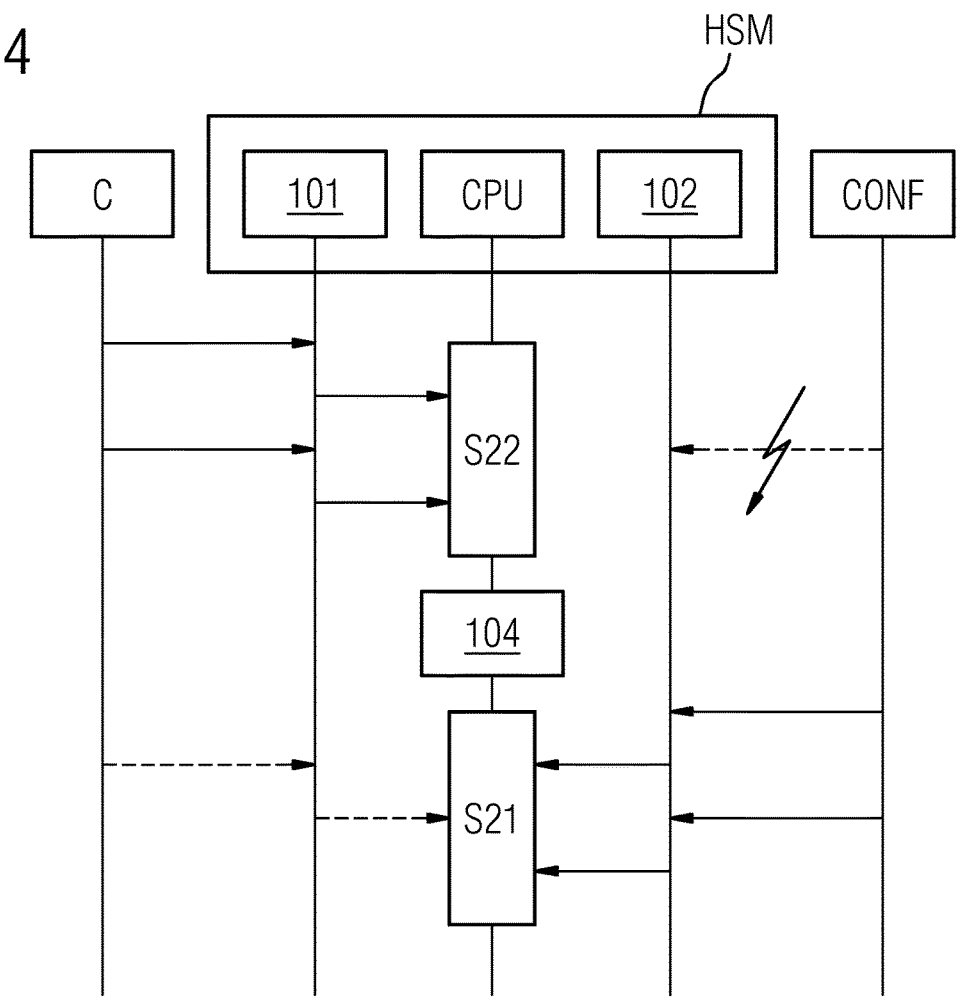
FIG. 4 depicts a sequence diagram, representing interaction between the respective entities in a schematic form.

FIG. 4 is a sequence diagram showing the interactions between entities of the hardware security module HSM and external control unit C and an external configuration unit CONF. the control unit C and/or the configuration unit CONF may be provided as computers or servers or electronic devices with additional control and/or configuration functionality. The first interface 101, the central processing unit CPU and the second interface 102 are provided in the hardware security module HSM. If the hardware security module HSM is operated in the sealed mode S22, it may receive control instructions from the control unit C via the first interface 101 for security operation of the hardware security module HSM. Any intended access over the second interface 102 and/or third interface 103 (third interface not shown separately in FIG. 4) will be denied and is not possible, which is represented in FIG. 4 with dashed line crossed out.

If the operating mode is the unsealed mode S21, the second and/or third interface 102, 103 is activated and configuration is possible. As described above, in an exemplary embodiment, the mode of the hardware security module HSM may be changed by activating the switch 104.

Control commands received via the first interface 101 are processed also in the unsealed mode S21, shown in FIG. 4 with the dashed line. In this case, the response indicates that the response has been determined when being in unsealed mode and/or when detecting that the second interface 102 is connected to an external device. However, it is also possibly that control commands are not processed in the unsealed mode S21. Therefore, in FIG. 4, the transmission of the control signal form the control unit via the first interface 101 is represented in dashed line. This variant allows for a simpler implementation. Furthermore, it is ensured that during updating the firmware of program code via the second interface, no response is determined (which may be erroneous due to inconsistent configuration data and/or program code).

The second interface 102 can be used for multiple updates when being in unsealed mode S21, as shown in FIG. 4. For example, multiple firmware patches may be installed, or several libraries and application containers may be installed. However, it is also possible that the number of loadable updates is limited. In particular, it is possible that only one single application program code or one single container can be loaded. As soon as a first application program code or a first container has been loaded, no further application program code or container can be loaded. First, the HSM would have be sealed, and unsealed again before loading of an application program code or container image is possible again. Also, it is possible to restrict the types of loadable code/data. For example, after loading one or more firmware updates, it may not be possible to load application program code or a container, without first sealing and unsealing the HSM.

The proposed solution can be well applicable in a technical production system supporting Internet of Things (IoT) where the IoT devices have to be operated in a secure environment. The present invention provides an optimized way of operating the hardware security module HSM by improving security and speed of configuration for the hardware security module HSM. Thus, security requirements and time for configuration of the hardware security module HSM are improved both at the same time. The first interface 101 will not get overloaded due to using it for loading of high volume configuration data. The loading of configuration data is outsourced to the second-high speed interface 102. Furthermore, service operation is simplified as a service technician can use the second interface 102 for service without being required to disconnect the first interface 101.

While the present invention has been described in relation to its exemplary embodiments, it is to be understood that this description is for illustrative purposes only. For example, the hardware security module HSM may be employed in different technical systems, like smart metering systems, smart grid systems, energy automation, substation controller, industry systems, automation systems, process control systems, power generation, cloud robotics, additive manufacturing, intelligent traffic systems, interlocking systems, railway, automotive etc. For the person skilled in the art it is clear that the secure element SE needs not to be deployed as physical entity but also may be provided in the central processing unit. Accordingly, it is intended that the embodiment of the present invention be limited only by the scope of the claims appended hereto.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A hardware security module for usage with manufacturing devices, comprising:
   a secure element configured to detect an operating mode of the hardware security module by detecting a position of a first switch of the hardware security module which indicates whether the hardware security module is in a sealed mode or an unsealed mode, and providing a control signal in response to the detecting;
   a first interface configured to receive commands for controlling the hardware security module, in both the sealed mode and the unsealed mode;
   a central processing unit for processing application program code in a secure environment;
   a second interface configured for receiving configuration data, wherein the second interface is activated and deactivated in dependence of the operating mode such that configuration data is received by the second interface only in the unsealed mode; and
   a second switch coupled to the first interface and the second interface, wherein the control signal provided by the secure element directly controls the second switch to activate or deactivate the second interface by coupling or decoupling the second interface from the first interface.

2. The hardware security module according to claim 1, wherein the secure element is a key controlled switch.

3. The hardware security module according to claim 1, wherein the secure element is controlled by a command, which is received via the first interface.

4. The hardware security module according to claim 1, wherein the first switch is a mechanical switch, located at a position on the hardware security module difficult to access.

5. The hardware security module according to claim 1, wherein the hardware security module comprises a third interface for debugging application program code.

6. A method for operating a hardware security module in different modes, comprising a sealed mode and an unsealed mode, the method comprising:
   detecting an operating mode of the hardware security module by detecting a position of a first switch of the hardware security module;
   providing a control signal in response to the detecting;
   activating a second interface for receiving configuration data if the unsealed mode has been detected; and
   deactivating the second interface automatically if the sealed mode has been detected, during which commands are received via a first interface, wherein the second interface is deactivated by controlling a switch that decouples the second interface from the first interface;
   wherein the first interface is configured to receive the commands for controlling the hardware security module, in both the sealed mode and the unsealed mode, and the second interface configured for receiving the configuration data only in the unsealed mode.

7. The method according to claim 6, wherein the configuration data comprises data for configuring the hardware security module and comprises a security image.

8. The method according to claim 6, wherein the second interface is deactivated logically.

9. The method according to claim 6, wherein the second interface is deactivated physically.

10. The method according to claim 6, wherein the second interface is deactivated in dependence of at least one sensor signal, which is/are detected locally on the hardware security module.

11. The method according to claim 6, wherein the operating mode is only changed into the unsealed mode by a physical instruction locally on the hardware security module or logically via an unseal-command to be received via the first interface.

12. The method according to claim 6, wherein the configuration data is deleted automatically in case the sealed mode is changed into the unsealed mode.

13. A hardware security module for usage with manufacturing devices, comprising:
   a secure element configured to detect an operating mode of the hardware security module, the operating mode including an unsealed mode and a sealed mode;
   a first interface configured to receive commands for controlling the hardware security module in both the sealed mode and the unsealed mode;
   a central processing unit for processing application program code in a secure environment, wherein the secure element is integrated into the central processing unit and detects the operating mode automatically;
   a second interface configured for receiving configuration data, wherein the second interface is activated and deactivated in dependence of the operating mode such that the second interface receives the configuration data only in the sealed mode; and
   a switch coupled to the first interface and the second interface, wherein a control signal is provided by the secure element to directly control the switch to activate or deactivate the second interface by coupling or decoupling the second interface from the first interface.

14. The hardware security module according to claim 13, wherein the hardware security module comprises a third interface for debugging application program code.

* * * * *